United States Patent
Burlingham

(10) Patent No.: US 7,651,219 B2
(45) Date of Patent: Jan. 26, 2010

(54) EYEGLASS HOLDER

(76) Inventor: Francine Burlingham, 111 Roosevelt Ave., Kingston, NY (US) 12401

(*) Notice: Subject to any disclaimer, the term of this patent is extended or adjusted under 35 U.S.C. 154(b) by 0 days.

(21) Appl. No.: 12/257,243

(22) Filed: Oct. 23, 2008

(65) Prior Publication Data

US 2009/0128774 A1    May 21, 2009

Related U.S. Application Data

(60) Provisional application No. 60/981,958, filed on Oct. 23, 2007.

(51) Int. Cl.
*G02C 1/00* (2006.01)
(52) U.S. Cl. .................................. 351/158; 24/3.3
(58) Field of Classification Search .................. 351/41, 351/158; 24/3.3, 3.8, 31 V; 224/250, 268, 224/901, 233, 246; 2/94
See application file for complete search history.

(56) References Cited

U.S. PATENT DOCUMENTS

| | | | | | |
|---|---|---|---|---|---|
| 3,543,977 | A | * | 12/1970 | Lockridge | 224/222 |
| 4,168,544 | A | * | 9/1979 | Kallman | 2/94 |
| 4,969,239 | A | * | 11/1990 | Bruno | 24/3.3 |
| 5,081,714 | A | * | 1/1992 | Liu | 2/418 |

* cited by examiner

*Primary Examiner*—Hung X Dang
(74) *Attorney, Agent, or Firm*—West and Associates; Stuart J. West; Charlotte Rodeen-Dickert

(57) ABSTRACT

A system, method and device for comfortably, safely and securely holding eyeglasses close to and on the person, when not in use, is disclosed. In some embodiments, the device comprises an adjustable band member to comfortably fit around any persons arm or leg and an eyeglass holding member adjustably coupled to the top of the band member such that an eyeglass can securely, and safely be held between the band member and the eyeglass holding member.

9 Claims, 5 Drawing Sheets

EYEGLASS HOLDER

CLAIM OF PRIORITY

The present application claims the benefit of priority of U.S. Provisional application Ser. No. 60/981,958, filed Oct. 23, 2007, the complete contents of which is hereby incorporated herein by reference.

BACKGROUND

1. Field of the Invention

The present invention relates generally to devices for holding eyeglasses and more particularly to an eyeglass holder attachable to a person's arm, leg, appendage or other item.

2. Background

People who use eyeglasses consistently lose or misplacing them, especially people who do not wear their eyeglasses full-time and who need to take them off several times a day. Most commonly, these people drop their eyeglasses, lose them or leave them behind in a car or someplace else. What follows is a frustrating search for the eyeglasses.

Various mechanical eyeglass holders are known and can be used to attach eyeglasses to a Person's clothing and/or the visors of vehicles. However, mechanical eyeglass holders use metal clips to hold the eyeglasses in place. These metal clips, although sometimes padded, can damage and scratch expensive frames and/or lenses. Moreover, the eyeglass frames and/or lenses can be cracked and/or crushed by the clips, by a seat belt and/or when a person merely sits. Furthermore, when the person is running or engaged in any physical activity, mechanical eyeglass holders tend to detach from clothing thus allowing the glasses to fall to the ground and potentially causing damage to the frames and/or lenses.

Ropes or chains that hang around a person's neck are also known and can be used to hold the eyeglasses when not in use. These ropes and chains typically have loops that fit around the legs of eyeglasses leaving the eyeglasses resting on a person's chest when not in use. However, ropes and chains that hang around a person's neck are not very comfortable as they can cause strain on the vertebrae in the neck. Moreover, they are typically not aesthetically pleasing. The free-floating glasses can easily become tangled in jewelry, such as necklaces, that a person might be wearing. The free-floating glasses and/or chain/rope are also unsafe for the wearer, as they could get tangled in a stationary object entangle a person by the neck. The danger of eyeglasses getting crushed by seat belts also persists. Additionally, the lenses and/or frames of the glasses could easily be damaged by rubbing against or violently impacting a surface when a person leans forward with the free-floating glasses dangling from a rope/chain around his/her neck. Moreover, the loops on the ropes and chains that hold the legs of the eyeglasses, loosen over time and the eyeglasses can be damaged by falling to the ground. Furthermore, the ropes and chains are extremely old fashioned.

What is needed is a method and device for safely, securely and comfortably holding eyeglasses close to and on the person, when not in use.

SUMMARY

A system, method and device for safely, securely and comfortably holding eyeglasses close to and on the person, when not in use, is disclosed. In some embodiments, the device can comprise a band member with an adjustable hook-and-loop closure mechanism to comfortably fit around any person's arm, leg, other appendage and/or desired item. The device can further comprise an eyeglass holding member wherein one end is coupled to the top of the band member and other end has an adjustable hook-and-loop closure mechanism to securely, and safely hold the eyeglasses when not in use.

DETAILED DESCRIPTION

Figure 1:
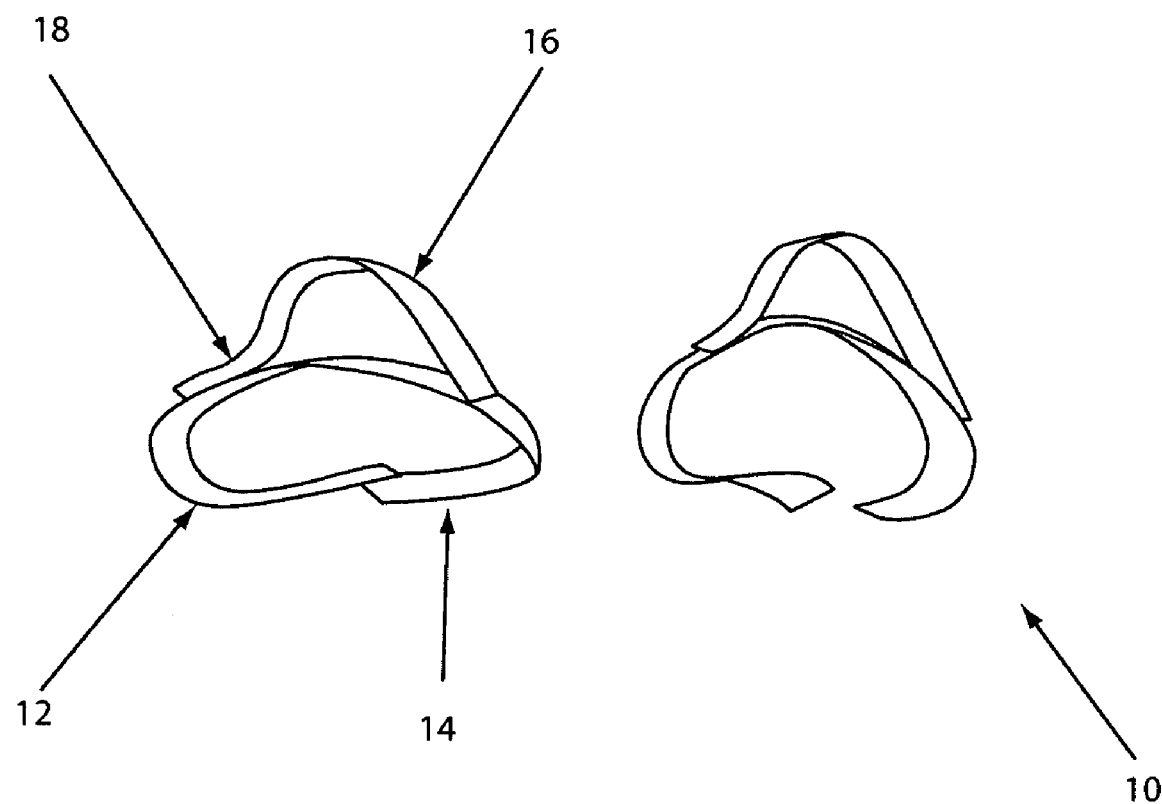
FIG. 1 illustrates details of an eyeglass holder according to an embodiment of the present device.

FIG. 1 illustrates details of an eyeglass holder 10 according to an embodiment of the present device. The eyeglass holder device 10 can comprise a band member 12 that adjustably and comfortably fits onto or around a person's arm, leg, other appendage or other item. The band member 12 can be made of any fabric, any elastic material, deformable plastic or any other known and/or convenient material and/or combination of materials that can be configured to comfortably fit onto a person's arm or leg and/or other desired item and that should not damage the frame and/or lenses of a pair of eyeglasses. In some embodiments, the band member 12 can be comprised of decorative fabric and/or any other material that can be decorated. The band member 12 can be made in various sizes, shapes and lengths so as to fit the arm or leg of any person and/or any desired item. In some embodiments the band member 12 can be about ten inches long and about one inch wide. However, in alternate embodiments the band member 12 can have any desired dimensions. The band member 12 can also be attached to any other appropriate part of the human body such as, forearm, ankle, and/or any other desired item.

The band member 12 can also comprise an adjustable hook-and-loop closure mechanism 14 to comfortably and adjustably fit the band member 12 around any persons arm or leg and/or desired appendage and/or other item. While depicted as a hook-and-loop fastener 14 in the embodiment depicted in FIG. 1, in alternate embodiments the closure mechanism can be snaps, buttons, fasteners or any other known and/or convenient selectively engageable closure mechanism.

The eyeglass holder device 10 depicted in FIG. 1 further comprises an eyeglass holding member 16. In some embodiments, one end of the eyeglass holding member 16 can be coupled to the top of the band member and other end can have a closure mechanism 18 to securely, and safely hold the eyeglass, when not in use, against the band member 12. While in the embodiment depicted in FIG. 1 the closure mechanism 18 is depicted to be comprised of hook-and-loop fastener, in alternate embodiments the closure mechanism can be any known and/or convenient selectively engageable closure mechanism. The eyeglass holding member 16 can be made of any fabric, any elastic material, deformable plastic and/or any other known and/or convenient material and/or combination of materials that can safely and securely hold the eyeglass and not damage the frame or lenses of the eyeglasses. In some embodiments, the eyeglass holding member 16 can be comprised of decorative fabric that matches the band member. However, in alternate embodiments, the holding member 16 can have an a contrasting design, any other desired pattern and/or design and/or no pattern and/or design. The holding member 16 can be made in various sizes, shapes and lengths so as to securely and safely hold any eyeglass. In some embodiments, the eyeglass holding member 16 can be about three inches long and about one inch wide. However, in alternate embodiments, the holding member 16 can have any desired dimensions and/or geometric proportions. In some embodiments, the eyeglass holding member can include a hook-and-loop closure mechanism to selectively engage the hook-and-loop closure mechanism located on the band member 12. In alternate embodiments, the closure mechanism can be snaps, buttons, fasteners and/or any other known and or convenient selectively engageable closure mechanism that can allow the eyeglass holding member to safely and securely hold the eyeglass, when not in use.

In some embodiments of the device 10, one end of the eyeglass holding mechanism can be sewn onto the top of the band member 12. In alternate embodiment of the device 10 eyeglass holding mechanism 16 can be fixedly attached to the top of the band member 16. In still further alternate embodiments, both band member 12 and eyeglass holding member 16 can made, partially and/or completely of an elastomeric material with both ends of the eyeglass holding member 16 fixedly attached to the band member 10 such that eyeglass can safely and securely be held between the eyeglass holding member and the band member.

Figure 2:
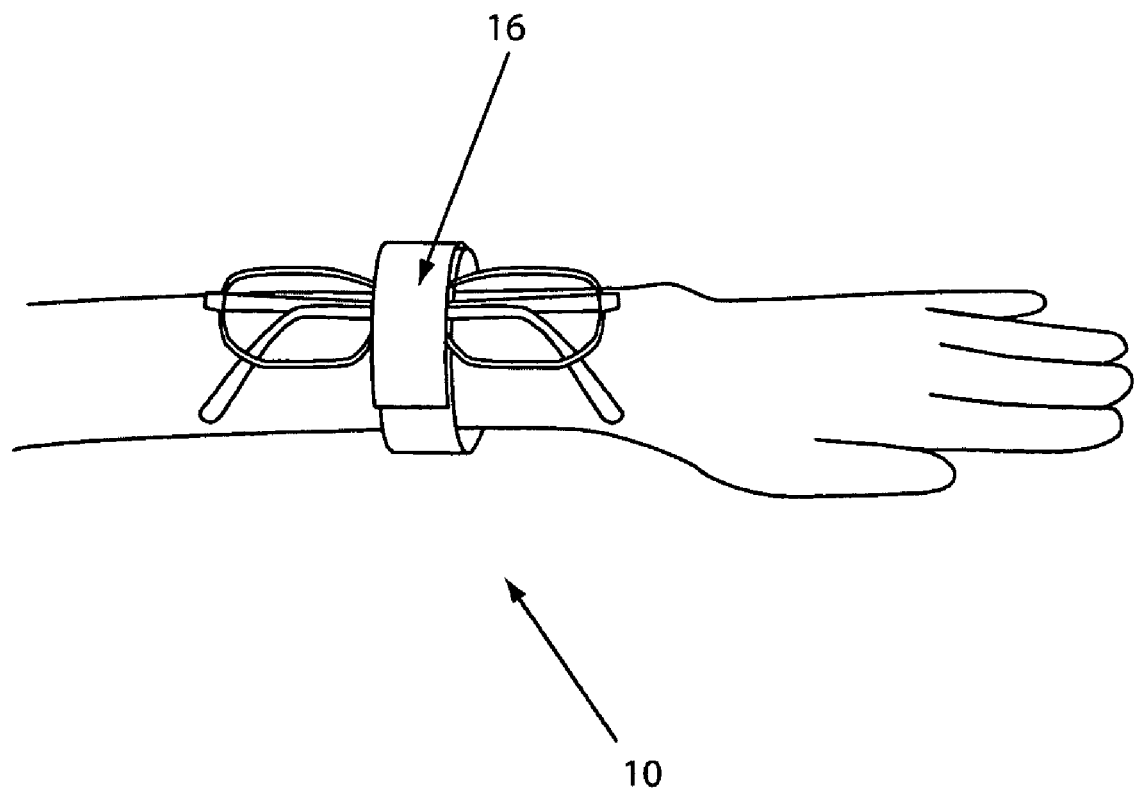
FIG. 2 illustrates an eyeglass holder in use, on a person's forearm, according to an embodiment of the present device.

FIG. 2 illustrates an eyeglass holding device 10 in use on a person's forearm, according to an embodiment of the present device. The device 10 can be comfortably secured on the forearm of a person using the band member's hook-and-loop closure mechanism 14. Eyeglass holding member 16 can then safely and securely hold the eyeglass using its own hook-and-loop closure mechanism 18.

In some embodiments, the band member 12 as well as the eyeglass holding member 16 can be made of matching decorative materials. In some embodiments, the eyeglass holding member 16 can be made of fabric to eliminate and/or avoid the chance of scratching or damaging the eyeglasses. In alternate embodiments, the eyeglass holding member 16 can safely and securely hold the eyeglasses in their folded state at the nose piece of the eyeglasses. In further alternate embodiments, when the eyeglass holding device 10 is not holding eyeglasses it can be used as a bracelet. In some embodiments, the eyeglass holding device 10 can be comprised of a machine washable material.

Figure 3:
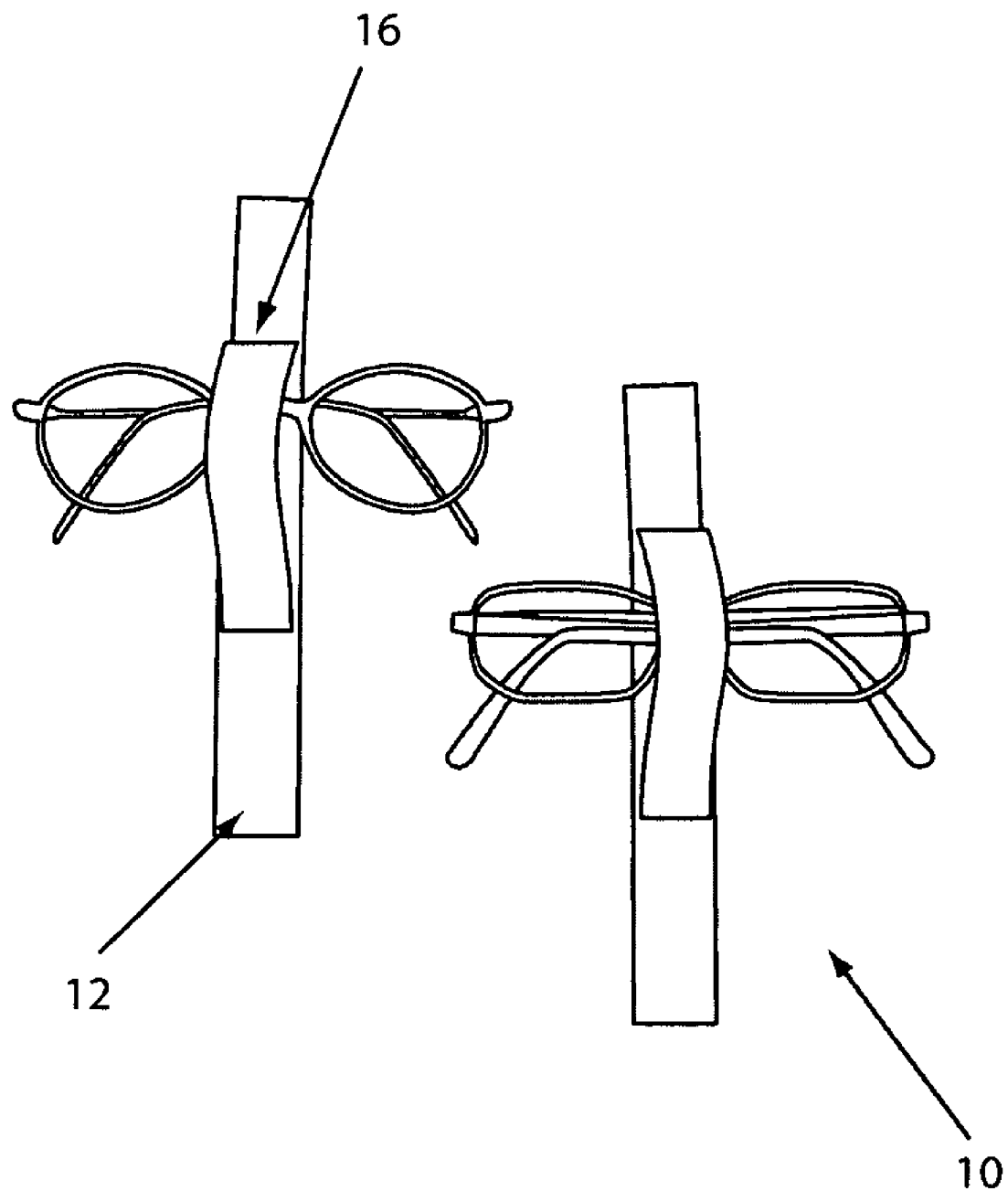
FIG. 3 illustrates a eyeglass holders safely and securely holding eyeglasses, according to an embodiment of the present device.

FIG. 3 illustrates the eyeglass holder 10 safely and securely holding eyeglasses between the eyeglass holding member 16 and the band member 12, according to an embodiment of the present device. In the embodiment depicted, the eyeglass holding member 16 can safely and securely hold eyeglasses in their folded state at its nose piece.

In alternate embodiments of the device, the eyeglass holder 10 can also be used to hold any other thing such as a cell phone, an mp3 player, and or any other desired device. In yet further alternate embodiments, the eyeglass holder 10 can be used to hold more than one pair of eyeglasses.

Figure 4:
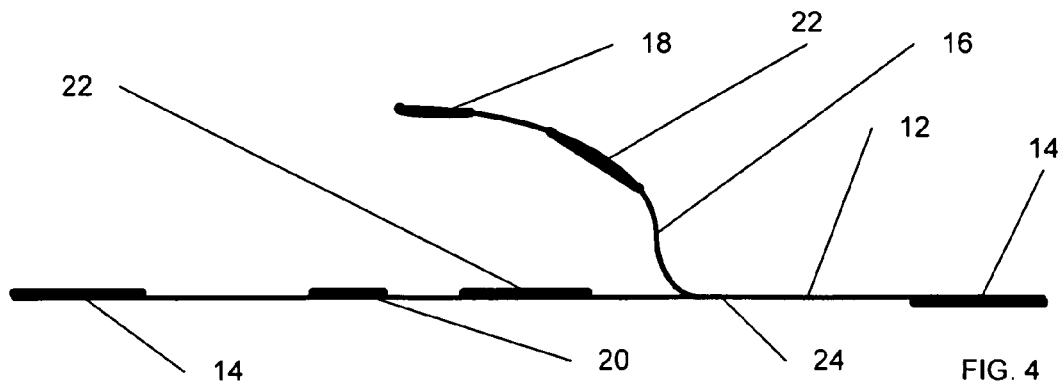
FIG. 4 depicts and alternate embodiment of the device depicted in FIGS. 1-3.

FIG. 4 depicts an alternate embodiment of the eyeglasses holder 10 depicted in FIGS. 1-3. In the embodiment depicted in FIG. 4, the device 10 can be comprised of a band member 12 and a holding member 16 coupled with the band member 12. In the embodiment depicted in FIG. 4, the band member 12 can include fastening mechanisms 14 at the ends of the band member 12 such that the band member 12 can be selectively configured to conform with a desired item when the fastening mechanisms 14 are engaged. In some embodiments, the band member can also comprise a fastening region 20 that can include a desired fastening mechanism 14. In some embodiments the fastening region 20 can be a hook-and-loop fastener material. However, in alternate embodiments the fastening region can be comprised of any known and/or convenient selectively engageable fastening mechanism.

In the embodiment depicted in FIG. 4, the band member 12 can additionally be comprised of a padded region 22. In some embodiments the padded region can be coupled with at least a portion of a top surface of the band member 12. In some embodiments, the padded region 22 can cover any desired portion of the band member 12, such that when the eyeglasses are retained between the holding member 16 and the band member 12, the eyeglasses will be at least in partial contact with the padded region 22. In some embodiments the padded region 22, can be comprised of a rubberized material, neoprene, sheep skin and/or any other desired, known and/or convenient material capable of elastically deforming under the load introduced by the eyeglasses and holding member 16. In some embodiments, the padded region 22 may not be present.

In the embodiment depicted in FIG. 4, the band member 12 can additionally be comprised of a non-slip region 24. In the embodiment depicted in FIG. 4, the non-slip region 24 is coupled with the lower surface of the band member 12. In some embodiments the non-slip region 24 can engage the entire lower surface of the band member 12. However, in alternate embodiments the non-slip region 24 can cover only a desired portion and/or portions of the any surface of the band member 12. In the embodiment depicted in FIG. 4, the non-slip region 24 can be comprised of a rubberized material adapted to frictionally engage the skin of a user, such that the band member 12 will resist movement relative to the skin of the user when in use. In alternate embodiments, the composition of the non-slip region can be selected such that it exhibits a high coefficient of static and/or kinetic friction relative to any desired material. In alternate embodiment, any known and/or convenient material can be used that is selected such that it exhibits a desired coefficient of static and/or kinetic friction relative to a desired material.

In the embodiment depicted in FIG. 4, the holding member 16 can comprise a closure mechanism 14 adapted to selectively and disengageably couple with the fastening region 20 on the band member 12, such that when the closure mechanism 14 and the fastening region 20 are engaged in a desired configuration, they form a closed loop capable of restraining the movement of a circumferentially contained item. In the embodiment depicted in FIG. 4, the holding member 16 can additionally comprise a padded region 22. In some embodiments the padded region can be coupled with at least a portion of a lower surface of the holding member 16. In some embodiments, the padded region 22 can cover any desired portion of the holding member 16, such that when an engaged item is retained between the holding member 16 and the band member 12, the engaged item will be at least in partial contact with the padded region 22. In some embodiments the padded region 22, can be comprised of a rubberized material, neoprene, sheep skin and/or any other desired, known and/or convenient material capable of elastically deforming under the load introduced by the eyeglasses and holding member 16. In some embodiments, the padded region 22 may not be present.

Figure 5:
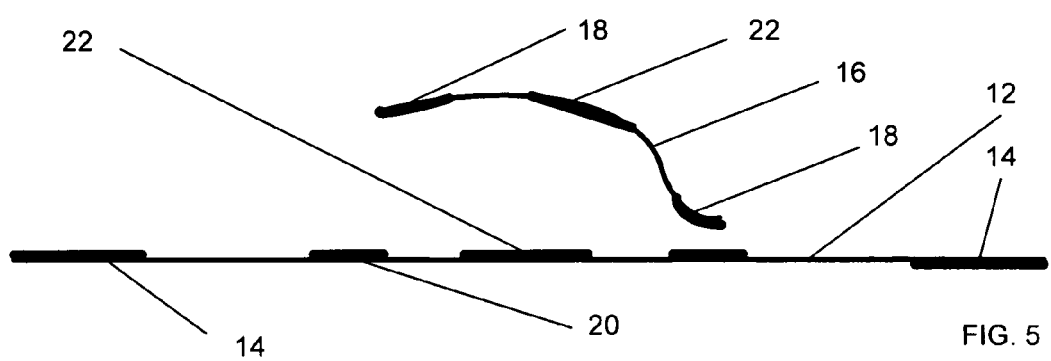
FIG. 5 depicts an alternate embodiment of the devices depicted in FIGS. 1-4

FIG. 5 depicts an alternate embodiment of the device 10 depicted in FIGS. 1-4. In the embodiment depicted in FIG. 5, the holding member 16 can be completely disengageably coupled with the band member 12 via closure mechanism 14.

Figure 6:
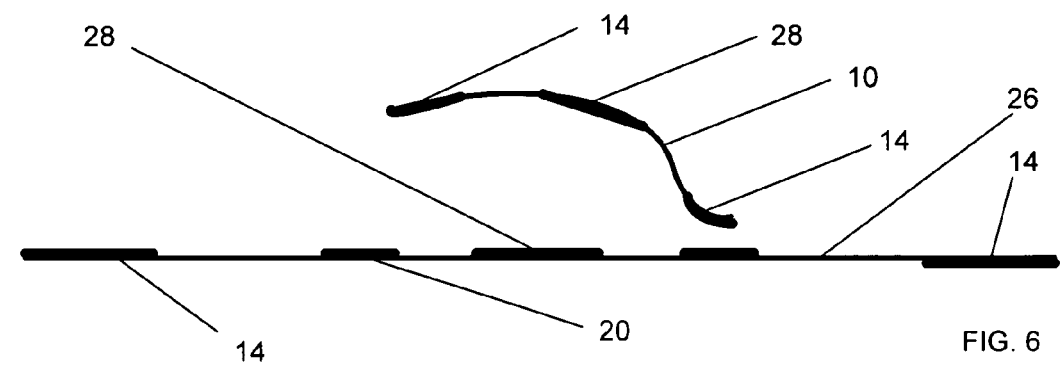
FIG. 6 depicts an alternate embodiment of the device depicted in FIG. 5.

FIG. 6 depicts an alternate embodiment of the device 10 depicted in FIGS. 1-5. In the embodiment depicted in FIG. 6, the band member 12 can include an elastic region 26. In some embodiments the elastic region 26 can be comprised of an elastically deformable section located between two segments of the band member 12. In alternate embodiments, the elastic region 26 can be integral and/or continuous with the band member 12, but can comprise different constituent components from the balance of the band member 12. In some embodiments, the elastic region 26 can be a select region of the band member 12 that has been woven with elastically deformable threads, such as Spandex® or any other known and/or convenient elastically deformable material that can be introduced into fabric to allow the fabric to undergo elastic deformation. In still further embodiments, more than one elastic region 26 can be included in the band member 12 and/or the entire band member 12 can be comprised of an elastic region 26.

Figure 7:
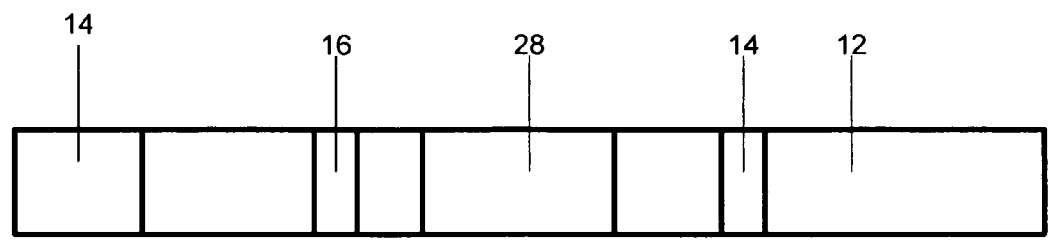
FIG. 7 depicts an alternate embodiment of the devices depicted in FIGS. 1-6

In the embodiment depicted in FIGS. 6 and 7 the device 10 can comprise pockets 28. In the embodiment depicted in FIGS. 6 and 7, the device 10 is depicted as having pockets 28 located on the top surface of the band member 12 and the top surface of the holding member 16. In some embodiments, the pockets 22 can be substantially flush with the surface of the member 12 16 and adapted and configured to contain one or more moisture containing or non-moisture containing, disposable and/or reusable cleansing cloths. In some embodiments, the pockets can be configured to have a moisture resistant seal at the edges and be lined with a moisture impermeable barrier, such that if one or more moistened cleansing cloths were contained within the pocket drying of the moisture within the cleansing cloths would be inhibited.

Figure 8:
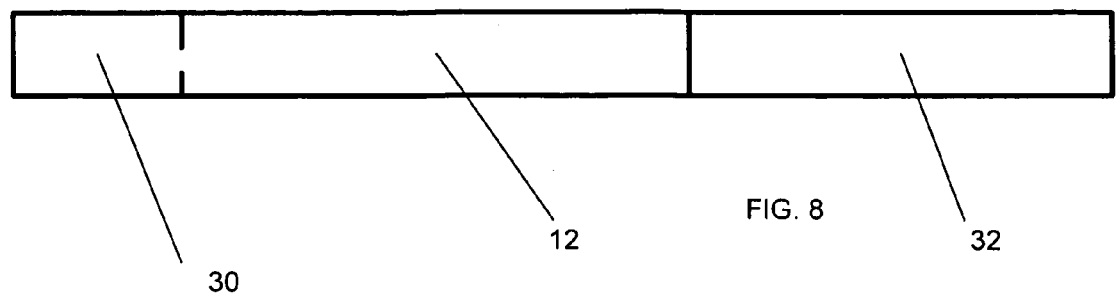
FIG. 8 depicts an alternate embodiment of the device.

FIG. 8 depicts an alternate embodiment of the device 10. The embodiment depicted in FIG. 8, is comprised of a band member 12 having a first securing region 30 and a second securing region 32. In the embodiment depicted in FIG. 8, the first securing region 30 is located on a first surface of the band member 12 and the second securing region 32 is located on a second surface of the band member 12. In some embodiments, the first securing region 30 can be the hook material of a hook-and-loop fastener and the second securing region 32 can be the loop material of a hook-and-loop fastener material. In some embodiments the first securing region 30 can be substantially smaller in area than the second securing region 32. In some embodiments, the first securing region can be substantially the same width as the band member 12 and can be approximately 3.5" long and the second securing region 32 can be substantially the same width as the band member 12 and can be approximately 5.5" long. However, in alternate embodiments the first and second securing regions 30 32 can have any desired dimensions individually and/or relative to each other and/or relative to the band member 12.

Figure 9:
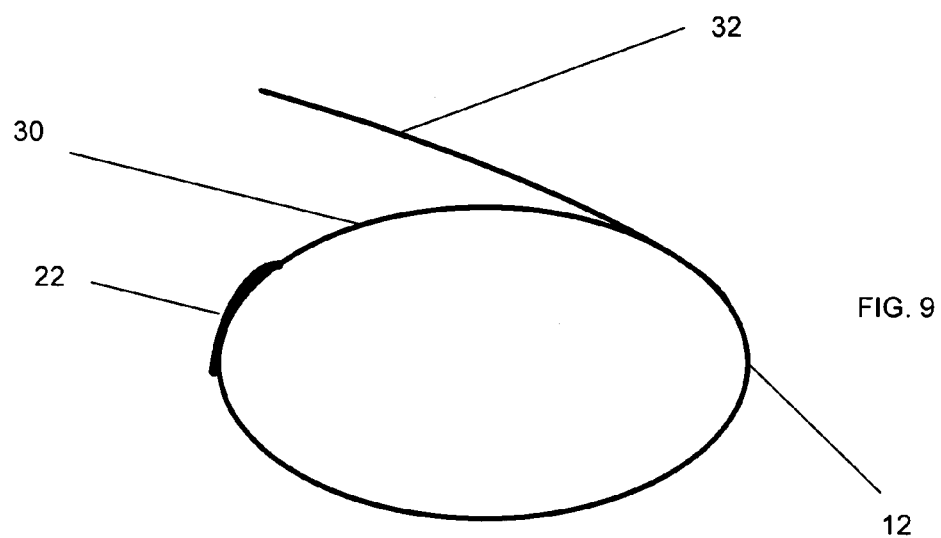
FIG. 9 depicts an alternate embodiment of the device depicted in FIG. 8
Figure 10:
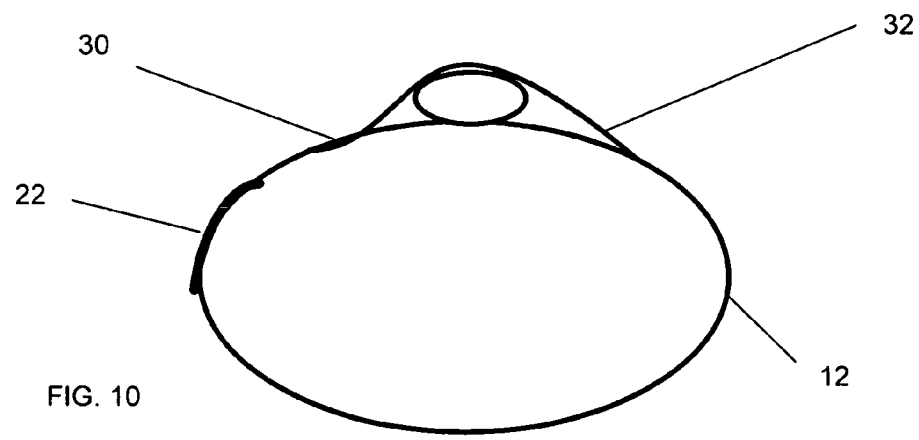
FIG. 10 depicts an embodiment of the device depicted in FIG. 9, in use.

FIGS. 9 and 10 depict an alternate embodiment of the device 10 depicted in FIG. 8. In the embodiment depicted in FIGS. 9 and 10, the device 10 is further comprised of a pocket 22 that can be adapted to contain one or more moistened and/or dry cleaning cloths. In some embodiments the pocket can be lined with a moisture impervious material and/or the pocket can be comprised of a moisture impervious material and can include a seal adapted to inhibit drying of a moistened cloth contained within the pocket.

In operation, the embodiment depicted in FIGS. 9 and 10 illustrate that the band member 10 can be secured in a loop configuration by securing a portion of the first securing region 30 with a portion of the second securing region 32. The engagement of these portions of the first and second securing regions 30 32, can form a closed loop around a user's arm, leg, appendage and/or any other desired item.

FIG. 10 depicts the embodiment of FIG. 9 wherein an item is secured between the first securing region 30 and the second securing region 32 by selectively engaging a section portion of the first securing region 30 to a second portion of the second securing region 32, such that an item's movement can be inhibited. In some embodiments the item can be a pair of eyeglasses. However, in alternate embodiments, the item can be any known and/or desired item that can be engaged between the first securing region 30 and the second securing region 32.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative sense rather than a restrictive sense.

What is claimed is:

1. An eyeglass holder comprising:
   a band member having a first end and a second end and a lower surface and an upper surface;
   a first fastener coupled with a first end of said band member;
   a second fastener coupled with a second end of said band member;
   a third fastener coupled with said band member between said first fastener and said second fastener;
   a holding member, having a first end and a second end and an outer surface and an inner surface, said first end being coupled with said band member between said first end and said second end of said band member;
   a pad located on the inner surface of and between the first end and the second end of said holding member; and
   a fourth fastener being coupled with a second end of said holding member;
   wherein when said third and fourth fasteners are engaged, movement of an item relative to said band member is restrained.

2. The holder of claim 1, wherein said pad is comprised of a material selected from the group consisting of: polymer, rubber, neoprene, sheepskin, and leather.

3. The holder of claim 2, wherein said holding member and said band member are comprised of an opaque material selected from the group consisting of:
   fabric, polymer, elastomer, metal.

4. The holder of claim 3, further comprising a pad located on the upper surface of said band member between said third fastener and the coupling point of the first end of said holding member and said band member.

5. The holder of claim 4, further comprising a fifth fastener coupled with the first end of said holding member and at least one additional fastener coupled with said band member between said first end and said second end of said band member.

6. The holder of claim 5, further comprising additional fasteners at the first end and second end of said band member to adjust the circumference of said band member in a closed position.

7. The holder of claim 6, wherein said fasteners are selected from the group consisting of: hook-and-loop, snaps, buttons, buckles.

8. The holder of claim 1, further comprising a pocket located on the outer surface of said holding member.

9. The holder of claim 1, further comprising a layer of slip-resistant material affixed to the lower surface of said band member.

* * * * *